United States Patent

Mohr

Patent Number: 5,916,658
Date of Patent: Jun. 29, 1999

[54] DRIP CATCHING MAT

[76] Inventor: Ronald G. Mohr, 9 Hartsfield Drive, Courtice, Ontario, Canada, L1E 1M7

[21] Appl. No.: 08/961,507

[22] Filed: Oct. 30, 1997

[51] Int. Cl.$^6$ .............................. B32B 3/02; B62D 27/00
[52] U.S. Cl. ......................... 428/81; 428/119; 428/120; 428/124; 428/167; 428/192; 296/38; 220/573; 184/106; 180/69.1
[58] Field of Search .................................. 428/159, 192, 428/167, 124, 81, 120, 119, 45; 296/38; 180/69.1; 5/417; 184/106; 220/573

[56] References Cited

U.S. PATENT DOCUMENTS

| 4,564,546 | 1/1986 | Jones | 428/81 |
| 4,826,030 | 5/1989 | Valley | 428/71 |
| 5,478,625 | 12/1995 | Wright | 428/119 |

*Primary Examiner*—Donald Loney

[57] ABSTRACT

A new drip catching mat for collecting drips from vehicular fluids and other road debris falling from a vehicle. The inventive device includes a base member for resting on a ground surface with a side wall extended upwardly and inwardly from the upper surface of the base member along the outer perimeter of the base member to together define a reservoir for holding liquids and debris, such as dripping oil and snow melt runoff from a vehicle over the drip catching mat.

7 Claims, 2 Drawing Sheets

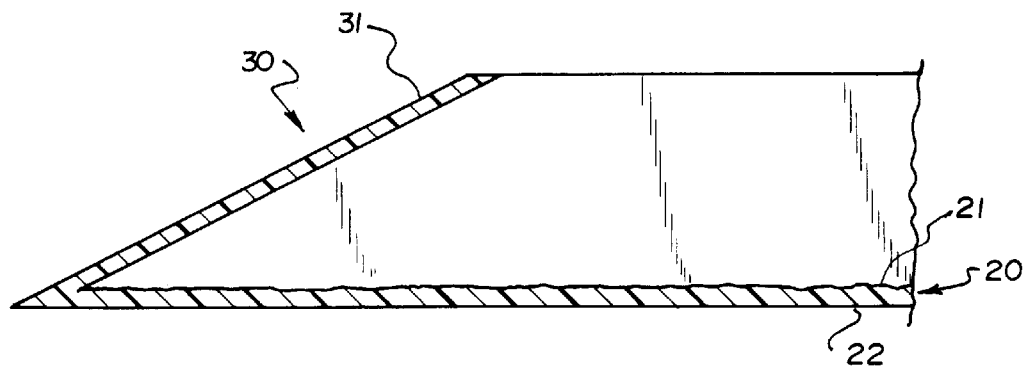
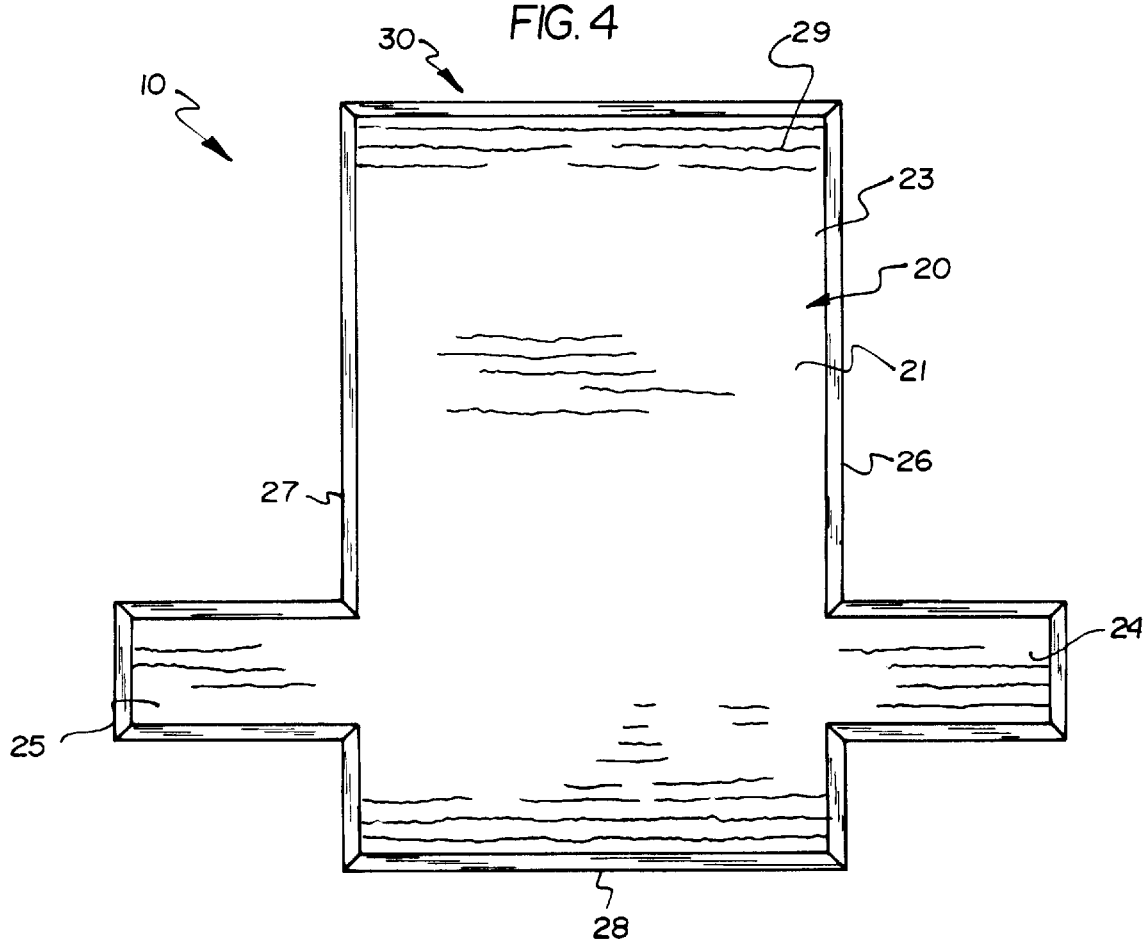

DRIP CATCHING MAT

BACKGROUND OF THE INVENTION

1. Field of the Invention

The present invention relates to drip catching devices and more particularly pertains to a new drip catching mat for collecting drips from vehicular fluids and other road debris falling from a vehicle.

2. Description of the Prior Art

The use of drip catching devices is known in the prior art. More specifically, drip catching devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art drip catching devices include U.S. Pat. No. 4,671,024; U.S. Pat. No. 4,798,754; U.S. Des. Pat. No. 307,623; U.S. Pat. No. 4,484,661; U.S. Pat. No. 5,308,670; and U.S. Pat. No. 4,826,030.

While these devices fulfill their respective, particular objectives and requirements, the aforementioned patents do not disclose a new drip catching mat. The inventive device includes a base member for resting on a ground surface with a side wall extended upwardly and inwardly from the upper surface of the base member along the outer perimeter of the base member to together define a reservoir for holding liquids and debris, such as dripping oil and snow melt runoff from a vehicle over the drip catching mat.

In these respects, the drip catching mat according to the present invention substantially departs from the conventional concepts and designs of the prior art, and in so doing provides an apparatus primarily developed for the purpose of collecting drips from vehicular fluids and other road debris falling from a vehicle.

SUMMARY OF THE INVENTION

In view of the foregoing disadvantages inherent in the known types of drip catching devices now present in the prior art, the present invention provides a new drip catching mat construction wherein the same can be utilized for collecting drips from vehicular fluids and other road debris falling from a vehicle.

The general purpose of the present invention, which will be described subsequently in greater detail, is to provide a new drip catching mat apparatus and method which has many of the advantages of the drip catching devices mentioned heretofore and many novel features that result in a new drip catching mat which is not anticipated, rendered obvious, suggested, or even implied by any of the prior art drip catching devices, either alone or in any combination thereof.

To attain this, the present invention generally comprises a base member for resting on a ground surface with a side wall extended upwardly and inwardly from the upper surface of the base member along the outer perimeter of the base member to together define a reservoir for holding liquids and debris, such as dripping oil and snow melt runoff from a vehicle over the drip catching mat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drip catching mat apparatus and method which has many of the advantages of the drip catching devices mentioned heretofore and many novel features that result in a new drip catching mat which is not anticipated, rendered obvious, suggested, or even implied by any of the prior art drip catching devices, either alone or in any combination thereof.

It is another object of the present invention to provide a new drip catching mat which may be easily and efficiently manufactured and marketed.

It is a further object of the present invention to provide a new drip catching mat which is of a durable and reliable construction.

An even further object of the present invention is to provide a new drip catching mat which is susceptible of a low cost of manufacture with regard to both materials and labor, and which accordingly is then susceptible of low prices of sale to the consuming public, thereby making such drip catching mat economically available to the buying public.

Still yet another object of the present invention is to provide a new drip catching mat which provides in the apparatuses and methods of the prior art some of the advantages thereof, while simultaneously overcoming some of the disadvantages normally associated therewith.

Still another object of the present invention is to provide a new drip catching mat for collecting drips from vehicular fluids and other road debris falling from a vehicle.

Yet another object of the present invention is to provide a new drip catching mat which includes a base member for resting on a ground surface with a side wall extended upwardly and inwardly from the upper surface of the base member along the outer perimeter of the base member to together define a reservoir for holding liquids and debris, such as dripping oil and snow melt runoff from a vehicle over the drip catching mat.

Still yet another object of the present invention is to provide a new drip catching mat that catches fluid leaks from vehicles to help prevent the staining of the driveway.

Even still another object of the present invention is to provide a new drip catching mat that is able to withstand the driving over it by vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic partial cross-sectional view of the present invention taken from line 3—3 on FIG. 1, illustrating the side wall.

FIG. 4 is a schematic top view of the embodiment of the present invention having a base member with tire positioning portions.

DESCRIPTION OF THE PREFERRED EMBODIMENT

Figure 1:
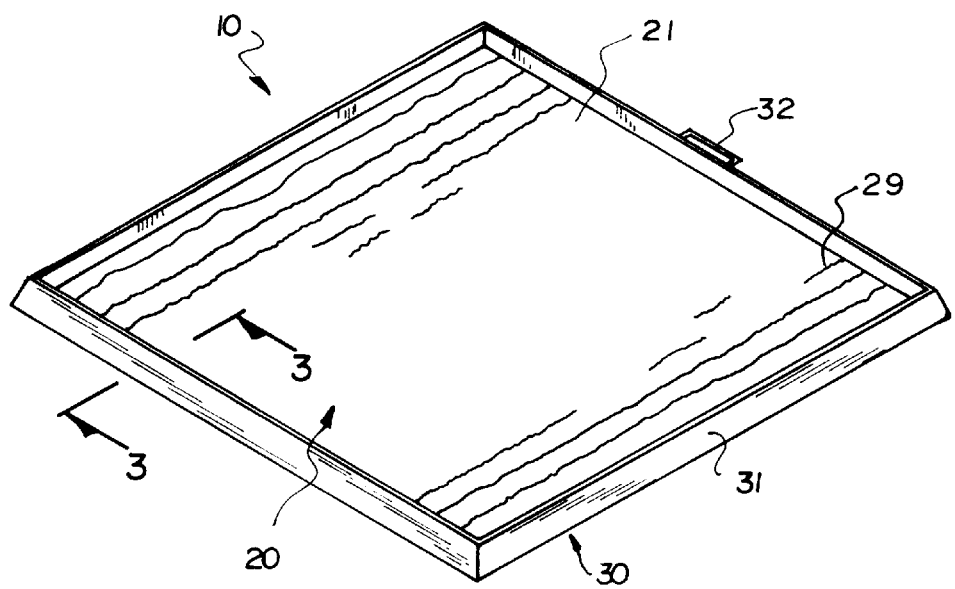
FIG. 1 is a schematic perspective view of the rectangular embodiment of a new drip catching mat according to the present invention.
Figure 2:
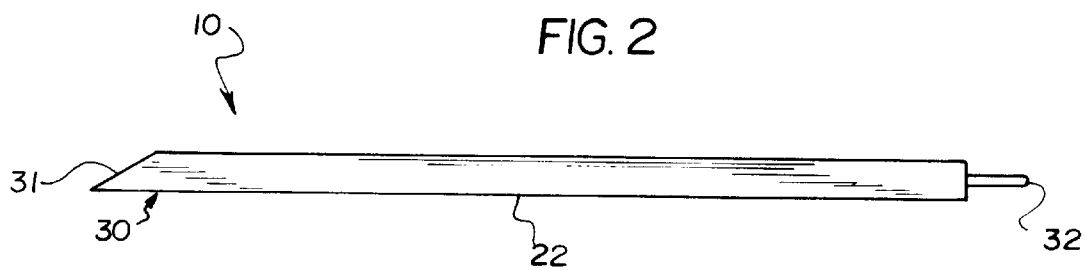
FIG. 2 is a schematic side view of the rectangular embodiment of the present invention.

With reference now to the drawings, and in particular to FIGS. 1 through 4 thereof, a new drip catching mat embodying the principles and concepts of the present invention and generally designated by the reference numeral 10 will be described.

As best illustrated in FIGS. 1 through 4, the drip catching mat 10 generally comprises a base member 20 for resting on a ground surface with a side wall 30 extended upwardly and inwardly from the upper surface 21 of the base member 20 along the outer perimeter of the base member 20 to together define a reservoir for holding liquids and debris, such as dripping oil and snow melt runoff from a vehicle over the drip catching mat 10.

Preferably, the base member 20 has substantially planar upper and lower surfaces 21,22. As shown in FIGS. 1 and 4, the base member either be rectangular in shape, as shown in FIG. 1, or have a rectangular main portion 23 and a pair rectangular tire positioning portions 24,25, as shown in FIG. 4. With respect to the preferred embodiment depicted in FIG. 4, one of the tire positioning portions 24 is extended from one of the longitudinal sides 26 of the main portion 23 while the other tire positioning portion 25 extends from the other longitudinal side 27 of the main portion 23. Ideally, both tire positioning portions 24,25 are positioned towards one of the lateral sides 28 of the main portion 23. The tire positioning portions 24,25 are each designed for resting a tire of a vehicle on so that when a vehicle is driven over the invention, they help hold the base member 20 to the ground and help position the vehicle over the main portion 23.

Ideally, a plurality of spaced apart ridges 29 are extended from the upper surface 21 of the base member 20. In this ideal embodiment, the ridges 29 are arranged in substantially parallel alignment with one another and are in substantially parallel alignment with the lateral sides 28 of the base member main portion 23. The ridges 29 are designed to help prevent splashing of liquid within the formed reservoir against the side wall 30.

In either preferred embodiment, the drip catching mat 10 has a side wall 30 extending around the outer perimeter of the base member 20. With reference to FIG. 3, the side wall 30 is extended upwardly and inwardly from the upper surface 21 along the base member outer perimeter to form a slanted surface 31. The slanted surface 31 permits the easy driving of a vehicle over it so that the side wall 30 is not damaged and the vehicle's wheel are easily able to rest on the upper surface 21 of the base member 20.

Also ideally, the drip catching mat 10 includes a handle 32 extending from the slanted surface 31 of the side wall 30. The handle is designed for helping a user maneuver and position the invention on a ground surface and to provide an easy carrying means for the invention.

The drip catching mat 10 is ideally made of a resilient material such as rubber to help prevent cracking or breaking of the invention when a vehicle is driven over it. The invention should also be made of a material that is oil resistant so that oil held in the reservoir does not seep through the base member 20. In an illustrative embodiment, the main portion 23 of the base member has longitudinal sides of about 60" and lateral sides of about 46" and a side wall with a height of about ¼".

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drip mat for collecting fluid drips from a vehicle, comprising:

a base member for resting on a ground surface, said base member having an upper surface, and an outer perimeter; and a side wall being extended upwardly from said upper surface along said base member outer perimeter to form a surface for permitting the driving of a vehicle thereover, said side wall and said base member upper surface defining a reservoir for holding liquids and debris;

wherein said base member has a main portion, and first and second tire positioning portions extending from said main portion. said first and second tire positioning portions each being for resting a tire of a vehicle thereon for helping hold said base member to a ground surface and for helping position a vehicle over said main portion;

wherein said main portion has a pair of lateral sides and a pair of longitudinal sides, wherein said first tire positioning portion is extended from one of said longitudinal sides of said main portion, wherein said second tire positioning portion is extended from another one of said longitudinal sides of said main portion.

2. The drip mat of claim 1, wherein said base member has substantially planar upper and lower surfaces.

3. The drip mat of claim 1, further comprising a handle being extended from said surface.

4. The drip mat of claim 1, further comprising a plurality of spaced apart ridges being extended from said upper surface of said base member.

5. The drip mat of claim 4, wherein said ridges are arranged in substantially parallel alignment with one another.

6. The drip mat of claim 5, wherein said ridges are in substantially parallel alignment with said lateral sides of said base member.

7. A drip mat for collecting fluid drips from a vehicle, comprising:

a base member for resting on a ground surface, said base member having substantially planar upper and lower surfaces, a rectangular main portion, rectangular first and second tire positioning portions, and an outer perimeter, said rectangular main portion having a pair of lateral sides and a pair of longitudinal sides, said first tire positioning portion having a pair of elongated sides and a pair of short ends one of which is extended from one of said longitudinal sides of said main portion in perpendicular relationship therewith, said second tire positioning portion having a pair of elongated sides and a pair of short ends one of which is extended from another one of said longitudinal sides of said main portion, said first and second tire positioning portions being positioned adjacent to and spaced from one of said lateral sides of said main portion, said first and second tire positioning portions each being for resting a tire of a vehicle thereon for helping hold said base member to a ground surface and for helping position a vehicle over said main portion;

a planar rectangular side wall coupled to the base member outer perimeter and being extended upwardly and inwardly from said upper surface along said base member outer perimeter and an outer perimeter of said tire positioning portions to form a slanted surface for permitting the driving of a vehicle thereover, said side wall and said base member upper surface defining a reservoir for holding liquids and debris;

a handle being extended from said slanted surface; and a plurality of spaced apart ridges being extended from said upper surface of said base member, said ridges being arranged in substantially parallel alignment with one another, said ridges being in substantially parallel alignment with said lateral sides of said base member main portion for preventing splashing of liquid within said reservoir against said side wall;

wherein said drip mat is constructed from a resilient rubber material that is oil resistant;

wherein said longitudinal sides of said main portion of said base member are about 60 inches in length, said lateral sides of said main portion of said base member are about 46 inches in length, and said side wall is about ¼ of an inch in height.

\* \* \* \* \*